(12) United States Patent
Bowie

(10) Patent No.: US 7,992,594 B2
(45) Date of Patent: Aug. 9, 2011

(54) SEALING APPARATUS

(75) Inventor: Angus George Bowie, Rothienorman (GB)

(73) Assignee: Stats (UK) Limited (GB)

( * ) Notice: Subject to any disclaimer, the term of this patent is extended or adjusted under 35 U.S.C. 154(b) by 407 days.

(21) Appl. No.: 12/176,532

(22) Filed: Jul. 21, 2008

(65) Prior Publication Data

US 2009/0020180 A1     Jan. 22, 2009

(30) Foreign Application Priority Data

Jul. 21, 2007   (GB) .................................. 0714294.6

(51) Int. Cl.
*F16L 55/16* (2006.01)
(52) U.S. Cl. .......................................... 138/99; 138/92
(58) Field of Classification Search .................... 138/99, 138/92
See application file for complete search history.

(56) References Cited

U.S. PATENT DOCUMENTS

| | | | | |
|---|---|---|---|---|
| 1,737,181 A * | 11/1929 | Woodward | ................. | 137/15.08 |
| 2,199,552 A | 5/1940 | Watson | | |
| 2,520,802 A | 8/1950 | Hampton | | |
| 2,581,015 A * | 1/1952 | Graham | ........................... | 138/99 |
| 2,790,655 A * | 4/1957 | Newell et al. | ................. | 285/373 |
| 2,843,155 A * | 7/1958 | Risley et al. | ..................... | 138/99 |
| 3,053,282 A * | 9/1962 | Fox | ................................. | 138/99 |
| 3,331,622 A * | 7/1967 | Bagnulo | ....................... | 285/198 |
| 3,744,822 A * | 7/1973 | Arnold | ............................ | 285/18 |
| 3,954,288 A * | 5/1976 | Smith | ............................. | 285/93 |
| 4,375,297 A | 3/1983 | Persson | | |
| 5,199,464 A | 4/1993 | Savard | | |
| 6,334,465 B2 * | 1/2002 | Boulet D'Auria | ............. | 138/99 |

FOREIGN PATENT DOCUMENTS

| | | |
|---|---|---|
| GB | 819387 | 9/1959 |
| GB | 1551251 | 8/1979 |

OTHER PUBLICATIONS

Search Report Under Section 17 for Application No. GB0813209.4 dated Nov. 18, 2008.

* cited by examiner

*Primary Examiner* — James F Hook
(74) *Attorney, Agent, or Firm* — Carlson, Gaskey & Olds PC

(57) ABSTRACT

An apparatus for sealing a pipe having a defect or penetration comprises a housing coupled to the pipe by a clamp member. A piston is mounted in the housing and the piston and housing define a chamber. The piston further comprises a port for providing fluid communication between the pipe and the chamber. A seal member is provided between the piston and the pipe and, in use, the apparatus is located over and/or around the defect or penetration in the pipe such that the seal member engages the pipe. The piston is urged towards the pipe by a fluid pressure force generated by fluid in the pipe thereby maintain sealing engagement between the seal member and the pipe and to prevent leakage of fluid through the penetration.

20 Claims, 2 Drawing Sheets

SEALING APPARATUS

CROSS REFERENCE TO RELATED APPLICATIONS

This application claims priority to United Kingdom Patent Application No. GB 0714294.6 which was filed on 21 Jul. 2007.

FIELD OF THE INVENTION

This invention relates to an apparatus for use in providing a sealing engagement with a pipe and, in particular, but not exclusively, to an apparatus for use in sealing a defect or penetration in a pipe, tube, conduit, pipeline or the like.

BACKGROUND OF THE INVENTION

In many industries, pipes or pipelines are utilized to transport fluid over distance. For example, in the oil and gas industry, there is a need to transport fluid over great distances and often over or through largely inaccessible terrain or deep water.

Of course, it will be recognized that it is important where a defect or penetration occurs in a pipe that the pipe is sealed to obviate or mitigate loss of fluid. Alternatively, it may be required to provide a sealed intervention into a pipe, for example, where a nozzle is to be added for the fitting of a branch or tee connection to a live pipeline containing fluid at pressure, typically termed "hot tapping."

At present, one method of sealing a pipe is to use a saddle clamp to cover the defect or penetration in the pipe. The saddle typically seals on a pad or, alternatively, on a ring seal encircling the defect or penetration to prevent escape of fluid from the pipe. In such an arrangement, energization of the seal is attained by pre-loading the seal on installation of the clamp, the pre-load being of a force in excess of the load generated by internal pressure within the pipe during operation. In this way, the penetration or defect may be isolated to prevent escape of fluid from the pipe.

The use of a clamp arrangement such as that described above operates sufficiently well for low pressure systems. However, the pre-load necessary to maintain the required sealing force is significant in relatively high pressure systems. There is also a need for the load to be evenly distributed over the seal. This can be problematic where, for example, the clamp is fitted to a de-pressurized pipe, as the pre-load may be sufficient to deform the pipe resulting in further defects or deformation to the pipe. This is particularly prevalent where the pre-load is applied to a thin walled pipe with low internal pressure.

Furthermore, it is known that the internal pressure in a pipe produces a radial force which resists external forces applied to the pipe. Thus, where the internal pressure within the pipe increases, an extrusion gap can form in the seal resulting in a reduction in operational effectiveness or failure of the seal.

SUMMARY OF THE INVENTION

According to a first aspect of the present invention there is provided an apparatus for use in sealing a defect or penetration in a pipe the apparatus comprising:

a body adapted to be coupled to a pipe;

a piston mounted in the body, a first face of the piston defining an actuating area of a first area and adapted for fluid communication with the pipe; and a seal member for isolating the defect or penetration, the seal member being operatively associated with the piston and defining a sealing area of a second area, the piston being adapted to be urged to maintain the seal member in sealing engagement with the pipe.

In a preferred embodiment, the piston comprises a bore or port for providing fluid communication between the pipe and the first piston face defining the actuating area. The bore may extend through the piston between the sealing area and the first piston face. The bore may extend axially through the piston.

Thus, in use, the invention may provide a pressure energized seal, the retained fluid pressure in the pipe being directed to the first face of the piston to urge or, where required, translate the piston relative the body. The piston urges the seal member to maintain sealing engagement with the pipe, this assisting in the prevention of fluid loss from the defect or penetration in the pipe.

It will be understood that reference to the term pipe includes any elongate construction including, for example, but not exclusively, an oil or gas pipeline, whether subsea, above or below ground, down hole tubing, or indeed any other conduit suitable for transport or storage of fluids. It will be further recognized that the present invention may be used on any cross sectional shape of pipe.

It will be recognized that fluid pressure within the pipe and being communicated through the defect or penetration provides a force acting against seal energization, this force corresponding to the pipe pressure multiplied by the sealing area. It will be further recognized that, due to fluid communication between the pipe and the first piston face, the same pressure acts on the actuating area. In a preferred embodiment, the first area is larger than the second, sealing area. Thus, as the actuating area is larger than the sealing area, the force urging sealing engagement of the seal member will be greater than the force acting against energization of the seal member. Thus, the retained pressure in the pipe will urge and/or translate the piston to provide or maintain sealing engagement between the seal member and the pipe.

The piston may house or provide mounting for the seal member. Alternatively, the seal member may be provided separately from the piston such that, in use, the piston may be urged and/or translated into engagement with the seal member or otherwise transmit a sealing force to the seal member.

The seal member may comprise an elastomeric seal. Alternatively, the seal member may comprise a graphite seal, or any other suitable seal member. Further, the seal member may comprise a compression seal, for example, but not exclusively, a face seal, ring seal or the like. Thus, in use, the piston may be urged and/or translated to compress the seal member to provide or maintain sealing engagement between the seal member and the pipe.

Alternatively, the seal member may comprise a lip seal, or any other suitable seal.

The seal member may be adapted to be compliant to the pipe surface, such that seal integrity may be maintained where the surface of the pipe is irregular or has been subject to damage, for example as a result of the penetration.

The seal member may be of any shape including, for example, an 'O' ring, 'D' seal, elastomer sheet or the like.

The apparatus may comprise a plurality of seal members operatively associated with the piston. Thus, the piston may be adapted to be urged to maintain one or more seal member in sealing engagement with the pipe.

At least one seal member may be uni-directional. Alternatively, or in addition, at least one seal member may be bi-directional. Thus, a bi-directional seal permits a seal to be retained when the seal member is exposed to pressure on either side of the seal.

Where two or more seal members are provided, the seal members may define an annulus therebetween.

The piston may further comprise a test port for providing fluid communication between the annulus and a corresponding port in the body. Pressure may be applied to the annulus, for example, via the test port, to permit testing or monitoring of the seals. The provision of a plurality of seal members further provides for retention of sealing engagement with the pipe should failure of one seal occur.

The apparatus may further comprise one or more sliding seal elements located between the piston and the body for sealing therebetween. A sliding seal element may define the actuating area. The provision of two or more sliding seal elements may permit pressure to be applied to the annulus, for example, via the test port, to permit testing of the seal elements.

The piston and the body may together define a chamber for receiving fluid from the pipe. Thus, fluid entering the chamber will act on the actuating area to urge the piston to maintain sealing engagement between the seal member and the pipe.

Further, the body and/or the piston may define or provide mounting for a boss or stand-off. A standoff permits fluid to enter the chamber and to permit the retained fluid pressure to act on the actuating area.

The apparatus may further comprise a clamp member for coupling the body to the pipe.

The clamp member may be configured to permit application of a pre-load to the body and thus the piston and seal member to provide initial energization of the seal member. The provision of a pressure energized seal will require the pre-load to be sufficient only to generate the initial seal, simplifying construction and/or installation of the apparatus. Furthermore, a reduction in the load to be applied to the pipe may obviate or mitigate deformation of the pipe by the pre-load force, for example assisting in preventing damage to a low pressure or de-pressurized pipe.

In addition, a reduction in the load applied facilitates provision of a relatively lightweight apparatus. This would be particularly beneficial where, for example, the pipe penetration is to be found in a remote or inaccessible location.

The clamp member may be integral to the body. Alternatively, the clamp member may comprise one or more separate components coupled to or providing mounting for the body.

The clamp member may, for example, but not exclusively, comprise a strap, cable, split sleeve clamp or any other suitable restraint on the pipe or vessel.

The clamp member may be constructed from a metallic material, for example, steel, though it will be understood that any material may be utilized, where appropriate.

Where the clamp member comprises more than one separate component or portion, the clamp portions may be removably coupled together, for example, but not exclusively, via one or more pin, bolt, screw or by another suitable fastener.

Alternatively, the clamp portions may be permanently coupled together, for example, but not exclusively, by welding, riveting or by another suitable means.

The clamp member may be adapted to be coupled to the body by a fastener. The body may further comprise one or more bore adapted to permit the clamp member or fastener to be inserted therethrough to secure the body to the pipe via the clamp member. At least a portion of the clamp member may be adapted to be orientated tangentially to the pipe, the fastener being orientated in line with the clamp member. This assists in a reduction in bending forces and permits the use of a smaller, lighter clamp member.

Furthermore, as the retained pipe pressure is utilized to provide the contact pressure on the seal member, the pressure differential across the pipe is minimized, minimizing deformation of the pipe, which deformation may otherwise result in the formation of an extrusion gap between the seal member and the pipe.

Also, the bearing load applied by the apparatus to maintain seal energization will increase in concert with any increase in pipe pressure such that the maximum bearing load impinging on the pipe applies where there is matching pipe pressure to support the pipe.

According to a second aspect of the present invention there is provided a method of sealing a defect or penetration in a pipe, the method comprising:

providing a body and coupling the body to a pipe;

providing a piston in the body, a first face of the piston defining an actuating area of a first area; and providing a seal member for isolating the defect or penetration, the seal member being operatively associated with the piston and defining a sealing area of a second area;

urging the piston to maintain the seal member in sealing engagement with the pipe.

Further aspects of the present invention are set forth in the independent claims. Further features are described in the dependent claims below.

BRIEF DESCRIPTION OF THE DRAWINGS

These and other aspects of the present invention will now be described, by way of example, with reference to the accompanying drawings, in which.

DETAILED DESCRIPTION OF THE DRAWINGS

Figure 1:
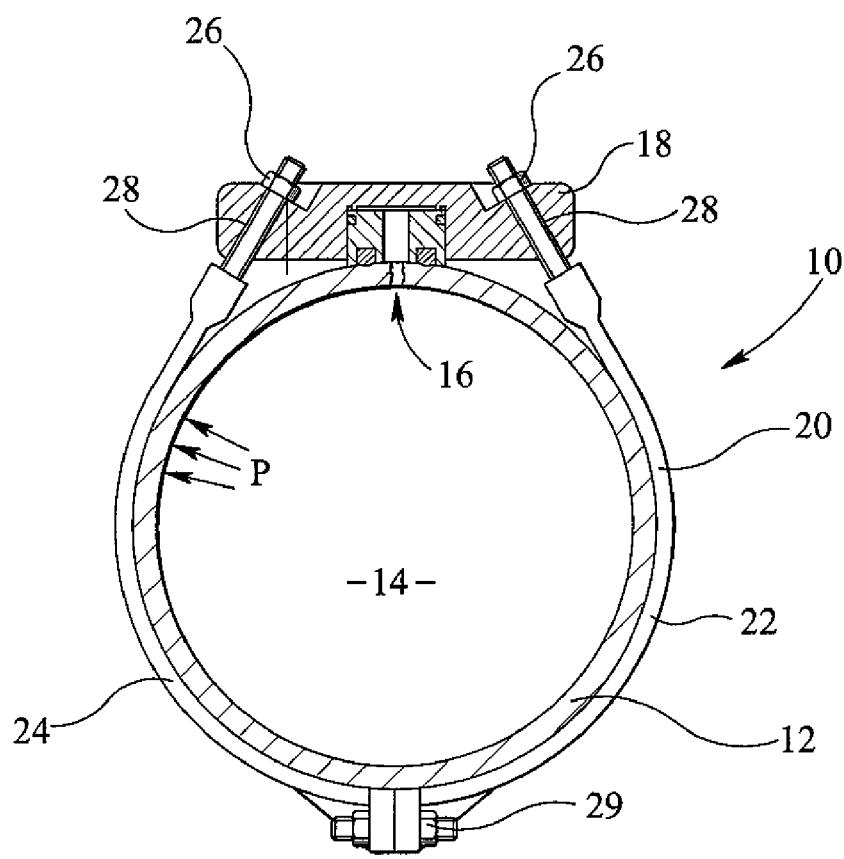
FIG. 1 is a sectional view of an apparatus for sealing a pipe in accordance with a first embodiment of the present invention.
Figure 2:
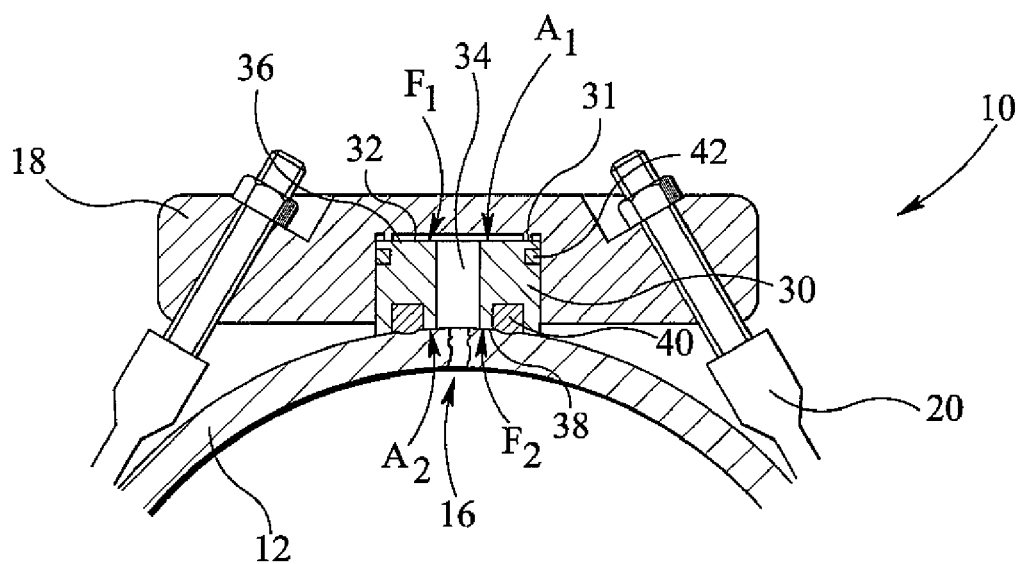
FIG. 2 is an enlarged view of an area of the apparatus of FIG. 1.

In reference initially to FIGS. 1 and 2 of the drawings, there is shown a sectional view of an apparatus 10 for sealing a pipe 12 in accordance with a first embodiment of the present invention. The pipe 12 is used to transport fluid 14 under pressure, the pipe pressure being indicated by P. The pipe 12 includes a defect or penetration 16 through which fluid 14 under pressure can exit.

As shown in the figures, the apparatus 10 including a body in the form of a housing 18 coupled to the pipe 12 by a clamp member or strap 20. The strap 20 is constructed from a steel cable and includes a split clamp, the clamp portions 22, 24 being coupled around the pipe 12 and secured to the housing 18 by bolts 26. The housing 18 further includes countersunk bores 28 which permit the ends of the clamp portions 22, 24 to be inserted therethrough and secured to the housing 18 by the bolts 26. As shown in FIG. 1, the clamp portions 22, 24 are orientated such that they are tangential to the pipe 12. This assists in reducing bending forces and permitting a smaller, lighter clamp 20 to be utilized. The bolts 26 are orientated such that they are in line with the clamp portions 22, 24. The portions 22, 24 are secured to each other below the pipe 12 via a bolted connector 29.

As shown most clearly in FIG. 2, the apparatus 10 further includes a piston 30 mounted in the housing 18, the piston 30 engaging an offset 31 provided in the housing 18 such that the piston 30 and housing 18 define a chamber 32. The piston 30 further includes an axial port 34 for providing fluid communication between the pipe 12 and the chamber 32. The piston 30 has a first face 36 defining an actuating area $A_1$ and a second face 38.

A seal member 40 in the form of a compression face seal is provided between the second face 38 of the piston 30 and the pipe 12 and is located over and/or around the defect or penetration 16 in the pipe 12. The seal member 40 defines a second, sealed area $A_2$ on the second face 38. Furthermore, a circumferential sliding seal element 42 is provided between the piston 30 and housing 18 to prevent loss of fluid 14 therearound.

In use, fluid 14 is directed from the pipe 12 through the axial port 34 to the chamber 32, the pipe pressure P acting on the actuating area $A_1$ of the piston 30 resulting in a force $F_1$ on the piston 30. The retained fluid pressure P within the pipe 12 provides a force $F_2$ acting against seal energization, this force $F_2$ corresponding to the pressure P within the pipe 20 multiplied by the area $A_2$. As the actuating area $A_1$ of the first face 36 is greater than the second, sealed area $A_2$, the force $F_1$ maintaining energization of the seal member 40 will be greater than the force $F_2$ acting against energization of the seal member 40.

It will be recognized that the net fluid pressure force on the piston will be substantially equivalent to the pipe pressure P multiplied by a factor equal to $A_2/A_1$. Thus, the piston 30 is adapted to be urged or translated relative to the housing 18 to urge the seal member 40 to maintain sealing engagement with the pipe 12. As such, fluid loss from the defect or penetration 16 may be reduced or eliminated.

Figure 3:
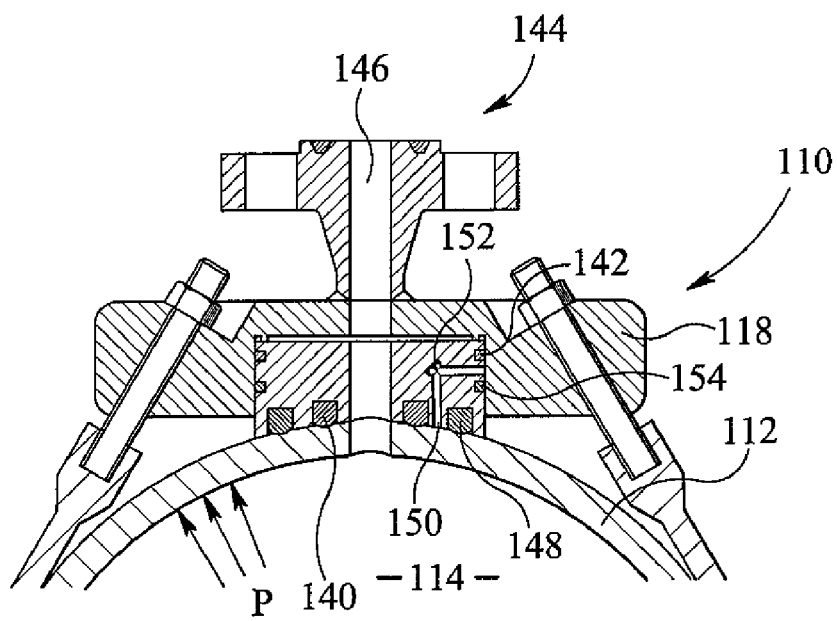
FIG. 3 is a sectional view of an apparatus for sealing a pipe in accordance with a second embodiment of the present invention, shown prior to energization of a seal.
Figure 4:
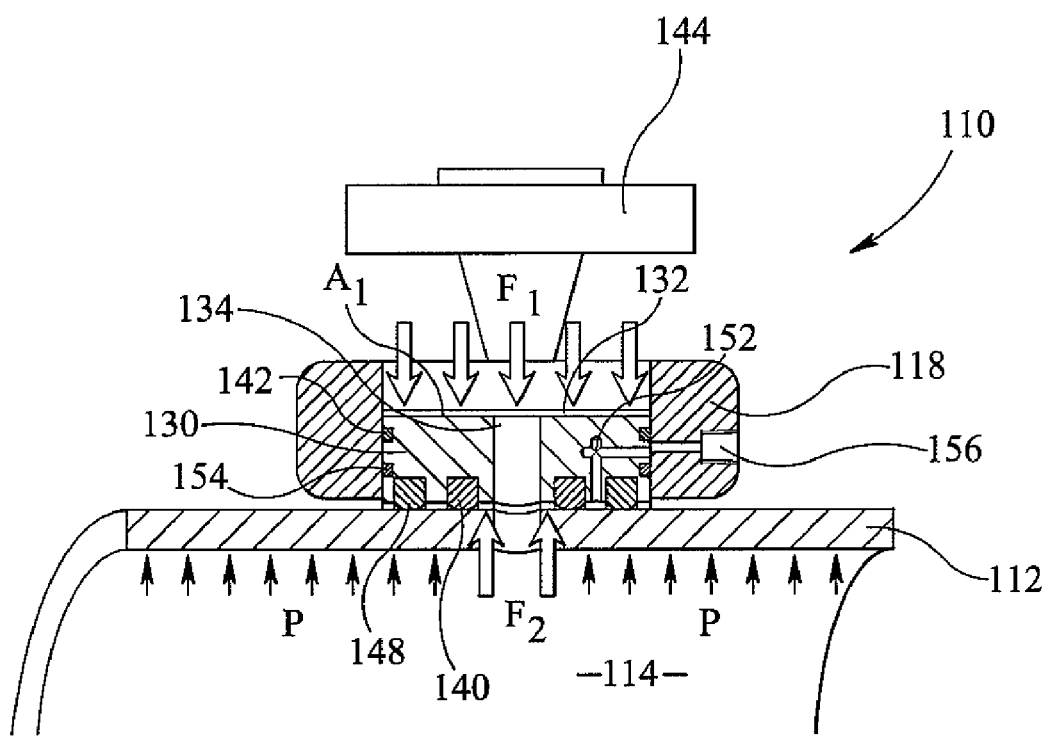
FIG. 4 is a sectional view of the apparatus of FIG. 3, shown during seal energization.

Referring now to FIGS. 3 and 4 of the drawings, there is shown sectional views of an apparatus 110 for sealing a pipe 112 in accordance with a second embodiment of the present invention, in which like components are indicated by like numerals incremented by 100.

In reference to FIG. 3, the apparatus 110 includes a branch or tee connection 144 coupled to a housing 118. The connection 144 also includes a bore or port 146 which, when coupled to the housing 118 sees the same fluid pressure P as fluid 114 in the pipe 112.

The apparatus 110 includes two seal members, a first seal member 140 and a secondary seal member 148. The first seal member 140 is a bi-directional seal, the seal member 140 permitting a seal to be retained when the seal member 140 is exposed to pressure on either side of the seal. The second seal member 148 is also a bi-directional seal, though a uni-directional seal may be used. The first and second seal members 140, 148 define an annulus 150 therebetween, the annulus being in fluid communication with a test port 152 provided in the piston 130. The provision of the second seal member 148 and test port 152 permits pressure to be inserted into the annulus 150 to test the integrity of the seal or seals. The provision of a second seal member 148 also provides a fallback should the first seal member 140 fail.

The piston 130 is further provided with circumferential first and second sliding seal elements 142, 154 on an outer face of the piston 130 in order to provide sealing around the test port 152. Insertion of pressure through the test port 152 will also permit monitoring of the seal elements 142, 154.

In reference now to FIG. 4 of the drawings, operation of the apparatus 110 is described.

Fluid 114 from the pipe 112 is transported through the piston 130 via the axial port 134 to the chamber 132. The retained pipe pressure P acts on the actuating area $A_1$ of the piston 130 resulting in a force $F_1$ (shown by the downward arrows in FIG. 4). The pipe pressure P also results in a force $F_2$ on the second, sealed area $A_2$, (shown by the upward arrows in FIG. 4).

As described above in respect of the first embodiment, the area $A_1$ is greater than the area $A_2$ such that the net force acting on the piston 130 urges and/or translates the piston 130 relative to the housing 118 to urge one or both of the seal members 140, 148 to maintain sealing engagement with the pipe 112.

As shown in FIG. 4, the housing 118 includes a port 156 which can be used to access the test port 152 of the housing 118 such that the pressure integrity between the first and second seal members 140, 148 can be monitored, where necessary. The seal elements 142, 154 are spaced so as to always encompass the housing port 156 over the stroke of the piston 130.

It will be clear to those of skill in the art that various modifications and improvements may be made to the above-described embodiment without departing from the present invention.

For example, the apparatus may be utilized where there is an existing penetration in a pipe and the apparatus is utilized to seal the penetration. Alternatively, or in addition, the apparatus may be utilized to provide sealing engagement prior to an intervention into the pipe through a connection, for example, to permit a branch or tee connection to be coupled to the pipe.

The invention claimed is:

1. A sealing apparatus for use in sealing a defect or penetration in a pipe, the apparatus comprising:
    a body adapted to be coupled to a pipe; and
    a piston slidably mounted in the body, the piston comprising a seal member adapted to engage the pipe, wherein the piston is adapted to be urged towards the pipe by a fluid pressure force generated by fluid in the pipe to maintain sealing engagement between the seal member and the pipe.

2. The apparatus of claim 1, wherein the piston comprises a face defining a first actuating area, the first actuating area adapted for fluid communication with the fluid in the pipe to urge the piston towards the pipe.

3. The apparatus of claim 2, wherein the piston comprises a bore for providing fluid communication between the fluid in the pipe and the first actuating area.

4. The apparatus of claim 2, wherein the piston comprises a face defining a second actuating area, the second actuating area adapted for fluid communication with the fluid in the pipe to urge the piston away from the pipe.

5. The apparatus of claim 4, wherein the first actuating area is of greater area than the second actuating area such that the fluid pressure force is adapted to urge the piston towards the pipe.

6. The apparatus of claim 1, wherein the piston and the body define a chamber adapted to receive fluid from the pipe to urge the piston towards the pipe.

7. The apparatus of claim 6, wherein at least one of the body and the piston define a boss adapted to permit fluid to enter the chamber.

8. The apparatus of claim 1, wherein the seal member comprises a face seal.

9. The apparatus of claim 1, wherein the seal member comprises a compression seal.

10. The apparatus of claim 1, wherein the seal member comprises at least one of an elastomeric seal, an 'O' ring seal, a 'D' seal, a graphite seal and an elastomer sheet seal.

11. The apparatus of claim 1, wherein the seal member comprises a bi-directional seal.

12. The apparatus of claim 1, wherein the seal member comprises a uni-directional seal.

13. The apparatus of claim 12, wherein the seal member comprises a lip seal.

14. The apparatus of claim 1, wherein the piston comprises a plurality of seal members.

15. The apparatus of claim 14, wherein the plurality of seal members comprise a primary seal member and a secondary seal member, the plurality of seal members defining an annulus therebetween.

16. The apparatus of claim 15, wherein the piston further comprises a test port for providing fluid communication with the annulus.

17. The apparatus of claim 15, wherein the annulus is adapted to receive fluid to permit testing of at least one of the plurality of seal members.

18. The apparatus of claim 1, further comprising a clamp member for coupling the body to the pipe.

19. The apparatus of claim 18, wherein the clamp member comprises at least one of a strap, a cable and a split sleeve clamp.

20. A method of sealing a defect or penetration in a pipe, the method comprising:
    providing a body having a piston slidably located therein, the piston comprising a seal member; and
    coupling the body to the pipe such that the seal member engages the pipe, wherein the piston is adapted to be urged towards the pipe by a fluid pressure force generated by fluid in the pipe to maintain sealing engagement between the seal member and the pipe.

* * * * *